(12) United States Patent
Horikawa

(10) Patent No.: US 7,430,493 B2
(45) Date of Patent: Sep. 30, 2008

(54) METHOD, SYSTEM AND PROGRAM FOR CORRECTING TIME OF EVENT TRACE DATA

(75) Inventor: Takashi Horikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/651,156

(22) Filed: Jan. 9, 2007

(65) Prior Publication Data

US 2007/0162244 A1 Jul. 12, 2007

(30) Foreign Application Priority Data

Jan. 11, 2006 (JP) ............................. 2006-003626

(51) Int. Cl.
*G01D 18/00* (2006.01)
*G01P 21/00* (2006.01)
*G01R 35/00* (2006.01)
*G04G 5/00* (2006.01)
*G04G 7/00* (2006.01)

(52) U.S. Cl. ........................................ 702/176; 702/89
(58) Field of Classification Search .................. 702/89, 702/106, 176–178, 187
See application file for complete search history.

(56) References Cited

U.S. PATENT DOCUMENTS

2003/0145125 A1* 7/2003 Horikawa .................... 709/318
2005/0193277 A1* 9/2005 Horikawa et al. ............. 714/45

FOREIGN PATENT DOCUMENTS

| JP | 2003-157185 | 5/2003 |
| JP | 2005-235054 | 9/2005 |

* cited by examiner

*Primary Examiner*—Michael P Nghiem
(74) *Attorney, Agent, or Firm*—Scully, Scott, Murphy & Presser, P.C.

(57) ABSTRACT

To provide a method of correcting time of event trace data which is capable of correcting a deviation in starting time for collection of trace data. A difference in clock running rate between machines is obtained as a clock skew value by carrying out communications among a plurality of machines to be corrected a plurality of times and by storing operations of each operation as trace data and a required period of time for communications using trace data of a plurality of machines based on data on time when communications are performed and on a required period of time for communications. A time stamp value is corrected by using the obtained clock skew value so that operations of the time stamp coincide with each other.

9 Claims, 16 Drawing Sheets

FIG.6

| Event type | Time |
|---|---|
| Data transmitting | ts1 (1.0) |
| Data transmitting | ts2 (2.0) |
| Data transmitting | ts3 (3.0) |
| Data transmitting | ts4 (4.0) |
| Data transmitting | ts5 (5.0) |

FIG.7

| Event type | Time |
|---|---|
| Data receiving | tr1 (1.0011001) |
| Data receiving | tr2 (2.0012001) |
| Data receiving | tr3 (3.0013001) |
| Data receiving | tr4 (4.0014001) |
| Data receiving | tr5 (5.0015001) |

FIG.8

| Time($tr_i$) | Required period of time for communications ($\tau_i$) |
|---|---|
| tr1 (1.0011001) | tr1 − ts1 ($\tau 1 = 0.0011001$) |
| tr2 (2.0012001) | tr2 − ts2 ($\tau 2 = 0.0012001$) |
| tr3 (3.0013001) | tr3 − ts3 ($\tau 3 = 0.0013001$) |
| tr4 (4.0014001) | tr4 − ts4 ($\tau 4 = 0.0014001$) |
| tr5 (5.0015001) | tr5 − ts5 ($\tau 5 = 0.0015001$) |

$$a = \frac{N\Sigma tr\ \tau - \Sigma tr\ \Sigma \tau}{N\Sigma tr^2 - \Sigma tr\ \Sigma tr}$$

$a$: Clock skew value
$N$: Number of items

FIG.13

| Transmitted time | Received time | Required period of time for communications |
|---|---|---|
| 1.0 (Machine A) | 1.001 (Machine B) | 0.001 |
| 2.0 (Machine B) | 2.001 (Machine A) | 0.001 |
| 101 (Machine A) | 101.001 (Machine B) | 0.001 |
| 102.0 (Machine B) | 102.001 (Machine A) | 0.001 |

FIG.14

| Time($t_{r_i}$) | Required period of time for communications ($\tau_i$) |
|---|---|
| tr1 (1.0011001) | tr1 − ts1 ($\tau 1 = 0.0011001$) |
| tr2 (2.0012001) | tr2 − ts2 ($\tau 2 = 0.0012001$) |
| tr3 (3.0013001) | tr3 − ts3 ($\tau 3 = 0.0013001$) |
| tr4 (4.01) | tr4 − ts4 ($\tau 4 = 0.01$) |
| tr5 (5.0015001) | tr5 − ts5 ($\tau 5 = 0.0015001$) |

FIG.18 (RELATED ART)

| Transmitted time | Received time | Required period of time for communications |
|---|---|---|
| 1.0 (Machine 1) | 1.0011001 (Machine 2) | 0.0011001 |
| 2.0002 (Machine 2) | 2.001 (Machine 1) | 0.0008 |
| 101 (Machine 1) | 101.0111001 (Machine 2) | 0.0111001 |
| 102.0102 (Machine 2) | 102.001 (Machine 1) | -0.0092 |

METHOD, SYSTEM AND PROGRAM FOR CORRECTING TIME OF EVENT TRACE DATA

BACKGROUND OF THE INVENTION

1. Field of the Invention

The present invention relates to a method, a system, and a program for correcting time of event trace data, and more specifically to a performance analysis to conduct an analysis on performance by using, as an input, trace data collected by a plurality of machines to be measured in almost the same time band and by utilizing event information about communication operations to be performed between machines being stored in the trace data.

The present application claims priority of Japanese Patent Application No. 2006-003626 filed on Jan. 11, 2006, which is hereby incorporated by reference.

2. Description of the Related Art

One example of a conventional system for collecting event trace data is disclosed in Japanese Patent Application Laid-open No. 2003-157185. As shown in FIG. 16, the conventional system to collect event trace data is made up of a trace data storing section 213, a trace data storing medium 202, and a probe included in an operating system 210.

In the conventional system to collect event trace data, time of occurrence of an event (represented as a time stamp) is obtained by using a clock 201 provided as hardware of the system to be measured. Since operations of the clocks in the machines vary slightly from machine to machine, if event trace data is collected from a plurality of machines to be measured, as light deviation (in order of $10^{-5}$ to $10^{-6}$) occurs in operations of the time stamp (time corresponding to "1" indicated by the time stamp value) between the time stamps.

A technology is disclosed in Japanese Patent Application Laid-open No. 2005-235054 in which, when performance is analyzed by using, as inputs, a plurality of trace data blocks, a deviation in time when collection of the trace data was started is corrected. According to this technology, since the deviation in time of starting collection of event trace data is corrected based on communication operations to be performed between machines to be measured, it is necessary that a transmitting event occurring in one machine and a receiving event occurring in another machine correspond exactly to each other. However, the conventional technologies have a problem. That is, if time for the collecting event trace data is made longer, as shown in FIGS. 17 and 18, a transmitting event corresponds exactly to a receiving event in a first part of the period (in the first half of the period) of collecting the trace data, however, in the latter half of the period, exact correspondence between the transmitting event and the receiving event is made impossible, that is, on a time stamp, the receiving event occurs earlier than the transmitting event, thus making it impossible to make a correction to the time of starting collection of the trace data.

Moreover, another problem arises in the conventional technologies in that, when a required period of time is analyzed, a required period of time for communications can be obtained in the first part (first half of the period) of the period of collecting trace data, however, as time elapses, the required period of time for communications becomes incorrect.

In other words, when the event trace data is collected in the plurality of machines at the same time and an analysis is conducted by considering a correspondence relation in communications to be carried out between machines, since operations of clocks (clock speeds) differ slightly from machine to machine, if communications between machines is to be extracted from the time stamp contained in the trace data, a relation between the transmitted time and the received time is out of order between in the first half and in the latter half of the period of collecting trace data and, therefore, exact extraction of communications between machines becomes impossible.

This problem is explained by referring to FIG. 17. FIG. 17 shows a time chart used to explain communications to be carried out between two machines in which a slanting arrow shows communications between machines. A root of the arrow corresponds to transmitting operations and a tip of the arrow corresponds to receiving operations. It is here assumed that a clock embedded in the machine 2 goes 0.0001 times faster than a clock in the machine 1 and it is also assumed, to simplify the explanation of the operations, that operations of both the clocks coincide with each other. A value shown by the clock in the machine 1 is called an "absolute time". That is, the time value read by the clock in the machine 2 is 1.0001 times larger than the absolute time value. As shown in FIG. 17, it is also assumed that a signal is transmitted from the machine 1 to the machine 2 when the absolute time is "1" and "101" and a signal is transmitted from the machine 2 to the machine 1 when the absolute time is "2" and "102" and the absolute time of its required period of time for communications is "0.001".

A signal transmitted by the machine 1 at absolute time "1" is received by the machine 2 at absolute time "2". The time when the signal was received by the machine 2 is "1.001001" being "1.0001" times larger than "1.001". On the contrary, a signal transmitted by the machine 2 at absolute time "2" (at time "2.0002" by the machine 2) is received by the machine 1 at absolute time "2.001". Similarly, a signal transmitted by the machine 1 at absolute time "101" is received by the machine 2 at absolute time "101.001" (clock in the machine 2 reads "101.0111001") and a signal transmitted by the machine 2 at absolute time "102" (clock in the machine 2 reads "102.0102") is received by the machine 1 at time "102.001".

Here, it is assumed that data on an event trace including transmitting and receiving operations is collected by the machines 1 and 2. Configurations of the machine 1 from which the event trace data is collected are shown in FIG. 16. As shown in FIG. 16, the trace data is stored by the trace data storing section 213 into the trace data storing medium 202 (for example, in area assigned in a memory of the machine). The trace data storing section 213 is invoked every time when probing is performed by the probe embedded in the operating system 210 and event data corresponding to the probe is stored in the trace data storing medium 202. The probe installed in the machines includes also probes installed in a data receiving section 211 and a data transmitting section 212. When the data receiving operation and data transmitting operation are performed, the trace data storing section 213 is invoked and event data showing that the receiving and transmitting operations have been performed is stored in the trace data storing medium 202. The event data contains information about types of events and time stamp information showing time of occurrence of an event and a time stamp is obtained from the clock 201 in each machine. The reason why absolute time is not used as a time stamp is that there is a difficulty in using absolute time as the time stamp or that practicality as an event trace is lost due to overhead occurring when absolute time is acquired.

FIG. 18 is a result from calculation processes in which time required for the transmitting and receiving operations in each communication is extracted from the event trace data collected from the two machines and a required period of time for communications (=received time-transmitted time) is calculated based on a time stamp in which trace data is stored. The calculated required period of time for communications carried out at absolute time 102 through 102.001 is a negative value. That is, an apparently contradictory phenomenon occurs that receiving operations are performed before transmitting operations are performed. Moreover, in the other three communications, apparently, a require period of time for communications changes with a lapse of time. As a result, a problem arises that, even when an analysis on communications between machines is conducted by using, as input data, the trace data as described above, it is impossible that an exact result is obtained.

SUMMARY OF THE INVENTION

In view of the above, it is an object of the present invention to provide a method, a system, and a program for correcting time of event trace data which is capable of correcting a deviation in starting time for collection of trace data.

According to a first aspect of the present invention, there is provided a time correcting method for event trace data to make a correction with respect to time of occurrence of an event contained in event trace data in which an event occurring at time of executing programs on a plurality of computers is stored as time-series data, the method including:

a first step of calculating a clock skew value being a difference in operations of clocks built-in the plurality of computers to be measured; and a second step of correcting time of occurrence of an event contained in the event trace data collected by executing a given program on the plurality of computers to be measured by applying the clock skew value obtained in the first step.

In the foregoing, a preferable mode is one wherein the first step of calculating a clock skew value being a difference in operations of clocks built-in the plurality of computers to be measured including:

a step of collecting event trace data by executing a transmitting program on one computer selected from the plurality of computers and a receiving program on another computer selected from the plurality of computers;

a step of calculating a clock skew value being a difference in operations of clocks built in the computers by an analysis of the collected event trace data, in which a plurality of transmitted events contained in event trace data collected from the one computer on which the transmitting program was run are made to exactly correspond to a plurality of received events contained in the event trace data collected from the another computer on which the receiving program was run and then a required period of time for communications is calculated from a difference in time of occurrence of the transmitted event corresponding to the time of occurrence of received event and finally a clock skew value is obtained by approximating a change in the required period of time for communications corresponding to the time by a linear equation.

Also, a preferable mode is one wherein effectiveness of the clock skew value is judged by approximating a change in a required period of time for communications corresponding to time calculated by an analysis of the event trace data by a linear equation and by calculating a difference between a required period of time for communications obtained by the linear equation and the required period of time for communications obtained by an analysis on the trace data.

Furthermore, a preferable mode is one, wherein, when the clock skew value is judged as not being effective, the case is handled as an object being outside of objects to be analyzed for communication operations in which a difference is big between the required period of time for communications obtained by the linear equation by which a change in the required period of time corresponding to time is approximated and the required period of time obtained by the analysis on trace data, and a clock skew value is again analyzed.

According to a second aspect of the present invention, there is provided a time correcting system for event trace data to make a correction to time of occurrence of an event contained in the event trace data in which the event occurring at time of executing programs on a plurality of computers is stored as time-series data, the system including:

a first section of calculating a clock skew value being a difference in operations of clocks built-in the plurality of computers to be measured; and a second section of correcting the time of occurrence of the event contained in the event trace data collected by executing a given program on the plurality of computers to be measured by applying the clock skew value obtained by the first section.

According to a third aspect of the present invention, there is provided a time correcting program for event trace data stored in a computer-readable storage medium to have a computer execute a time correcting method for event trace data to make a correction to time of occurrence of an event contained in the event trace data in which the event occurring at time of executing programs on a plurality of computers is stored as time-series data, the method including:

a first step of calculating a clock skew value being a difference in operations of clocks built-in the plurality of computers to be measured; and a second step of correcting the time of occurrence of the event contained in the event trace data collected by executing a given program on the plurality of computers to be measured by applying the clock skew value obtained in the first step.

With the above configurations, when various performance analyses are conducted by using, as inputs, a plurality of trace data blocks collected by a plurality of machines to be measured, coincidence of operations of the time stamp contained in the trace data is achieved and, therefore, configurations of the program used to conduct various performance analyses can be simplified. The reason why the above results can be realized is that, by using clock skew values obtained by an analysis of the event trace collected by executing the transmitting program and receiving program on the plurality of machines to be measured, a time stamp contained in the event trace collected by executing a given measuring program on the machine to be measured is collected by the time correcting section.

BRIEF DESCRIPTION OF THE DRAWINGS

The above and other objects, advantages, and features of the present invention will be more apparent from the following description taken in conjunction with the accompanying drawings in which:

FIG. 6 is a table showing an example of trace data of operations for communications collected by a machine A according to the first embodiment of the present invention;

FIG. 7 is a table showing an example of trace data of operations for communications collected by a machine B according to the first embodiment of the present invention;

FIG. 8 is a table showing a relation between received time and required period of time for communications in each operation for communications according to the first embodiment of the present invention;

FIG. 13 is a table showing a required period of time for communications calculated by using corrected time stamps according to the first embodiment of the present invention;

FIG. 14 is a table showing a relation between received time and a required period of time for communications according to a second embodiment of the present invention;

FIG. 18 is a table presenting a time relation of each machine in tabular form in conventional the technology.

DETAILED DESCRIPTION OF THE PREFERRED EMBODIMENTS

Best modes of carrying out the present invention will be described in further detail using various embodiments with reference to the accompanying drawings.

First Embodiment

Figure 1:
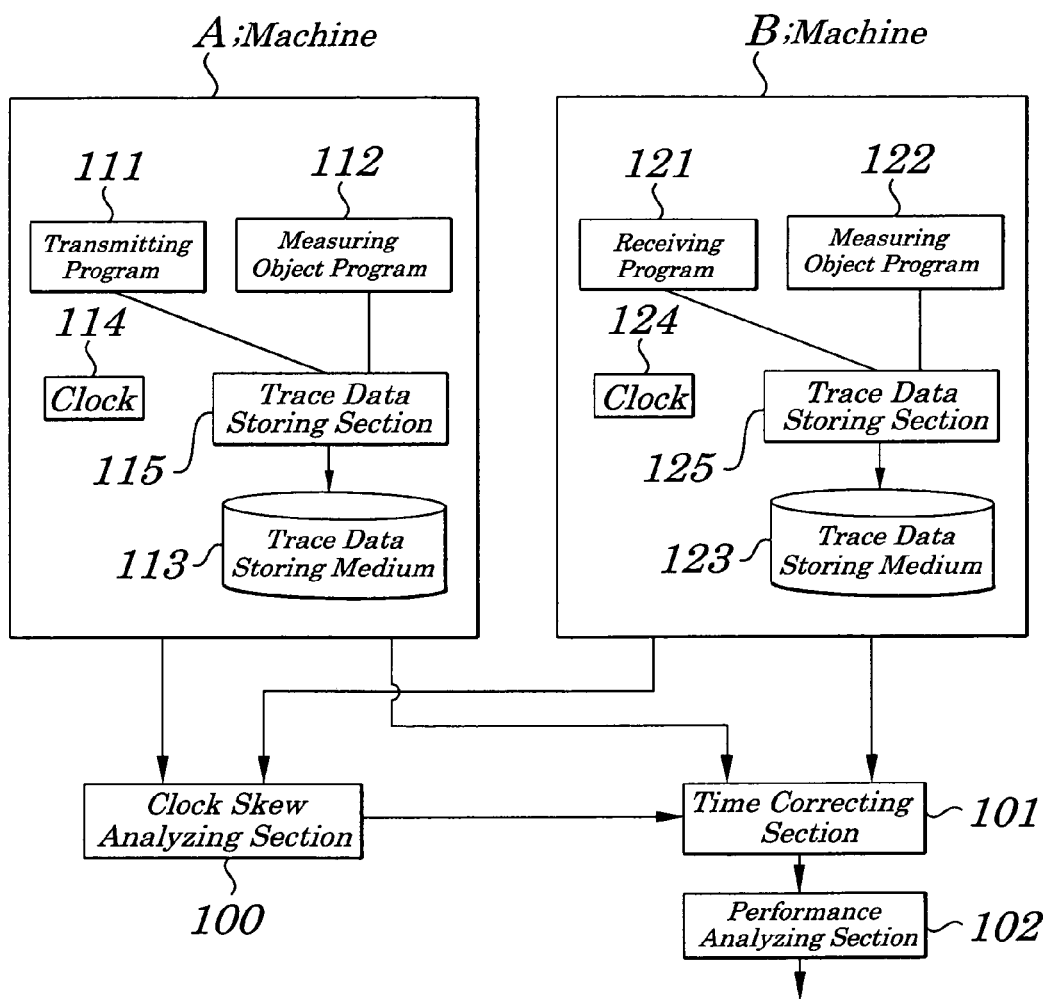
FIG. 1 is a diagram showing configurations of a clock skew correcting system according to a first embodiment of the present invention.

As shown in FIG. 1, the clock skew correcting system of the first embodiment of the present invention includes a machine (computer) A and machine (computer) B both operating under the control of programs, a transmitting program 111 and receiving program 121 both running respectively on the machines A and B to be used for an analysis of clock skew, a clock skew analyzing section 100, a measuring object program 112 and measuring object program 122 both running respectively on the machines A and B to apply the clock skew, a time correcting section 101, and a performance analyzing section 102. Moreover, the clock skew analyzing section 100, the time correcting section 101, and the performance analyzing section 102 may be installed on either of the machine A or the machine B, or on another computer other than the machines A and B.

The machine A further includes a clock 114 and a trace data storing medium 113 both being configured in the form of hardware and an operating system 210A (FIG. 2) having a built-in trace data storing section 115, a built-in data receiving section (not shown), a built-in data transmitting section (not shown) and a measuring object program 112. Also, the machine B includes a clock 124 and trace data storing medium 123 both being configured in the form of hardware and an operating system 210A (FIG. 2) having a built-in trace data storing section 125, a built-in data receiving section (not shown), a built-in data transmitting section (not shown), and a measuring object program 122. Moreover, neither the data receiving section on the machine A side nor the data transmitting section on the machine B side are shown in FIG. 1. Each of the built-in data receiving section (not shown) and the built-in data transmitting section (not shown) has a probe (not shown) to invoke the trace data storing section 115 or 125. Rough descriptions of these trace data storing section 115 and 125 are as follows.

The trace data storing section 115 and 125 embedded in the machines A and B respectively are invoked when probing by the probe installed in the operating system 210A (FIG. 2) is started, that is, when an event to be measured occurs, and store information about the occurred event into the trace data storing media 113 and 123 as event data. The clock skew analyzing section 100 calculates a value (clock skew value) denoting a difference in clock operations between the machines A and B by using trace data stored in the trace data storing media 113 and 123, as an input, collected almost simultaneously by the machine A on which the transmitting program 111 has been executed and by the machine B on which the receiving program 121 has been executed.

The time correcting section 101, when making various performance analyses by using trace data, as inputs, collected by running the measuring object programs 112 and 122 on the machines A and B respectively, corrects a time stamp contained in the trace data by applying a clock skew value obtained by the procedures described above. The performance analyzing section 102 receives a plurality of trace data each having a time stamp whose operation shows coincidences to conduct various performance analyses and to output analyzed results.

Figure 2:
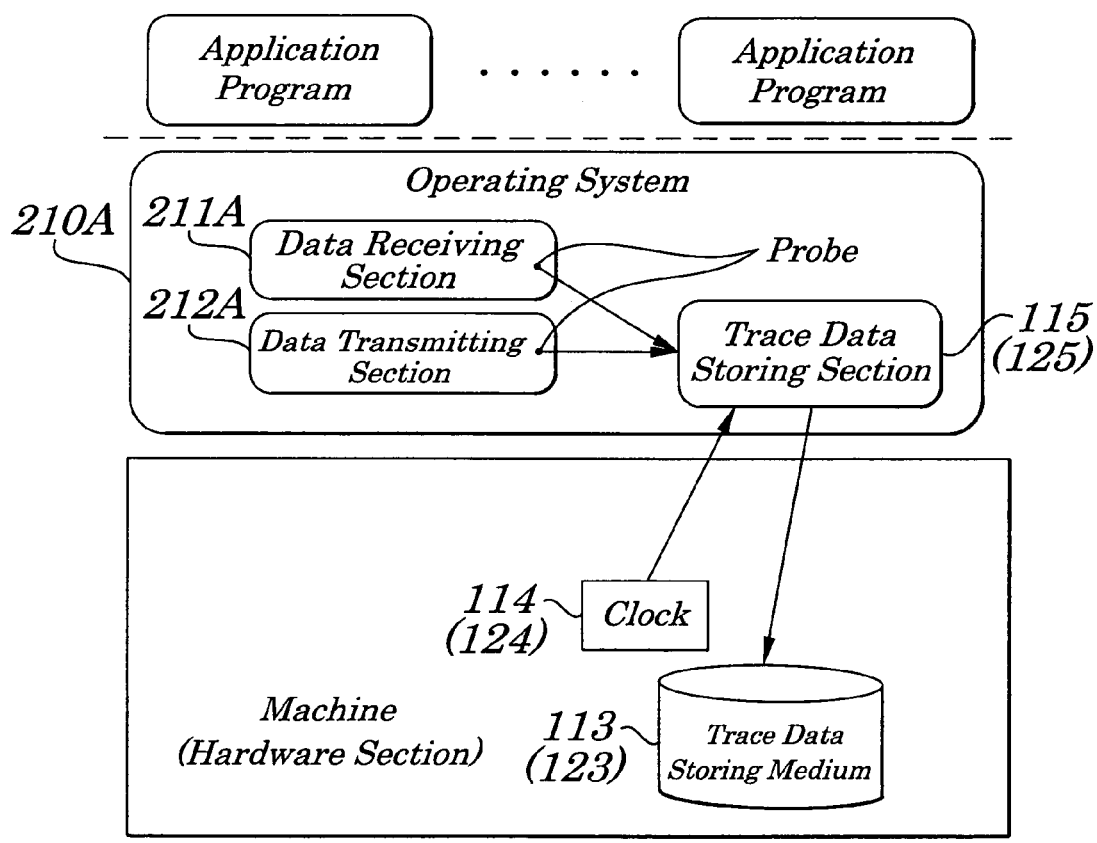
FIG. 2 is a diagram showing configurations of an event trace collecting system according to the first embodiment of the present invention.
Figure 3:
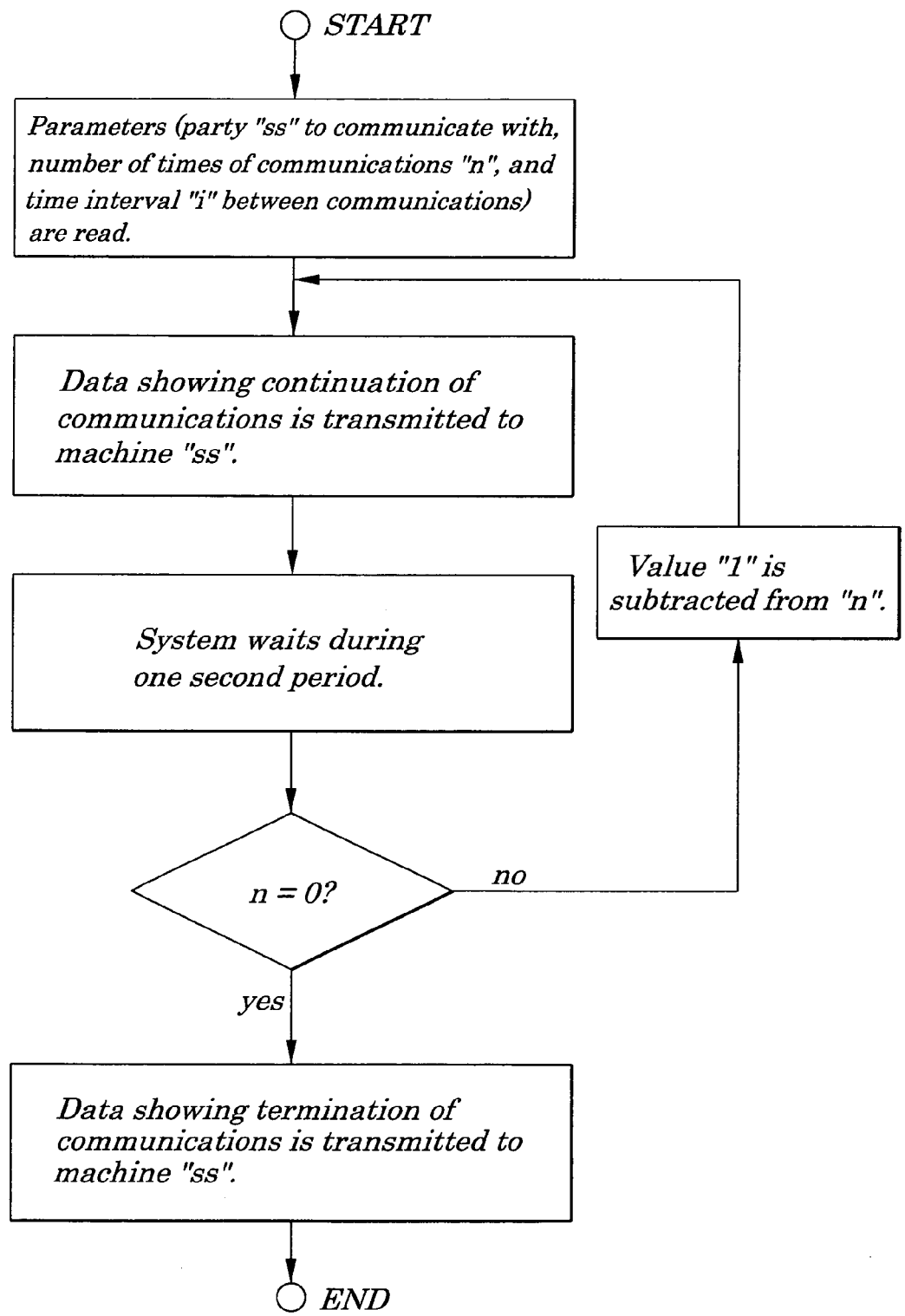
FIG. 3 is a flow chart used to explain operations of a transmitting program employed in the clock skew correcting system of the first embodiment of the present invention.
Figure 4:
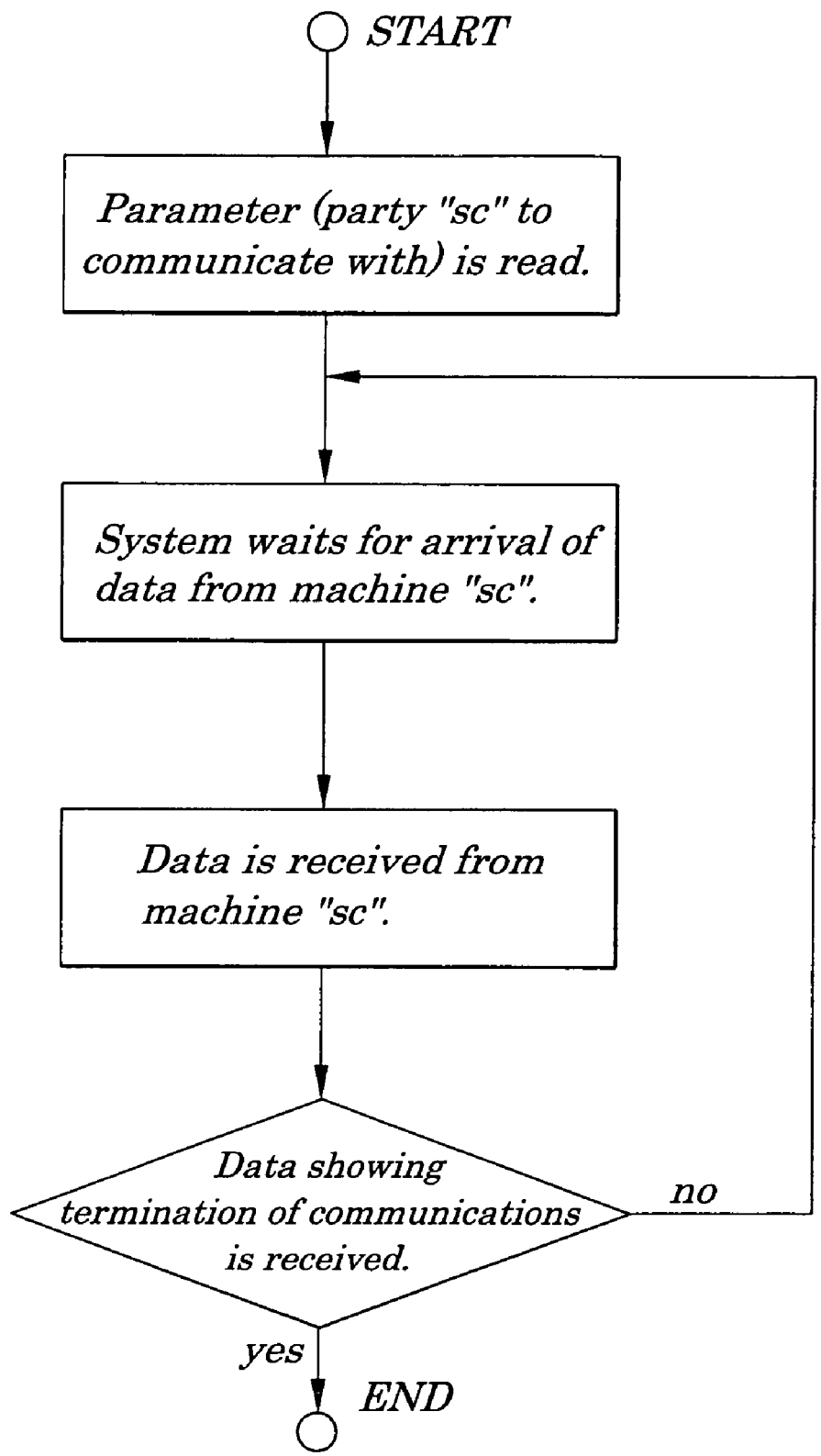
FIG. 4 is a flow chart used to explain operations of a receiving program employed in the clock skew correcting system of the first embodiment of the present invention.

Next, operations of the clock skew correcting system and the method employed in the embodiment of the present invention are described by referring to FIGS. 1 and 2, and to the flow chart shown in FIGS. 3 and 4.

In the clock skew analyzing processes to be performed first, the transmitting program 111 and the receiving program 121 are executed on the machine A and machine B respectively and the state of operations of both the machines A and B are stored in the trace data storing section 115 and 125 installed on both the machines A and B respectively. The transmitting operation controlled by the transmitting program 111 and the receiving operation controlled by the receiving operation controlled by the receiving program 121 are performed by the data transmitting section 212A and the data receiving section 211A installed in the machines A and B respectively. As in the case shown in FIG. 15 which shows the conventional case, a probe is provided so to correspond to each of the data transmitting section (not shown) and the data receiving section (not shown) and, when the data transmitting operation or the data receiving operation is performed, the trace data storing section 115 and 125 are invoked. The trace data storing section 115 and 125, when being invoked through the probe, check the time of being invoked by using the clocks 114 and 124 installed as hardware in the machines A and B respectively and create time-stamp information and store the information together with information indicating a type of an event (that is, information about which probe has invoked the trace data storing section 115 and 125). By performing the operations described above continuously for a measuring period (trace data collecting period), time series data (trace data) on an event occurred in each of the machines A and B is stored in the trace data storing media 113 and 123.

FIG. 3 is a flow chart used to explain operations of the transmitting program 111. As parameters at time of starting the transmitting program 111, information about a party to communicate with, number of times of communications, and a time interval of communications is input to the transmitting program 111. Immediately after the start of the transmitting program 111, the system reads the above three parameters under the control of the transmitting program 111, transmits data to the specified party to communicate with, and waits for a response for a period corresponding to specified communication intervals. The system, after repeating the above operations several times, notifies the party to communicate with of termination of the communication. FIG. 4 is a flow chart used to explain operations of the receiving program 121. As a parameter at time of starting the receiving program 121, information about a party to communicate with is input to the receiving program 121. Immediately after the start of the receiving program 121, the system, when reading the parameters described above, waits for the arrival of data from the party to communicate with. When the data arrives, the system receives the data. If the data does not indicate the termination of communications, the routine returns back to the step of waiting for the arrival of data. If the received data indicates the termination of communications, the program terminates.

Figure 5:
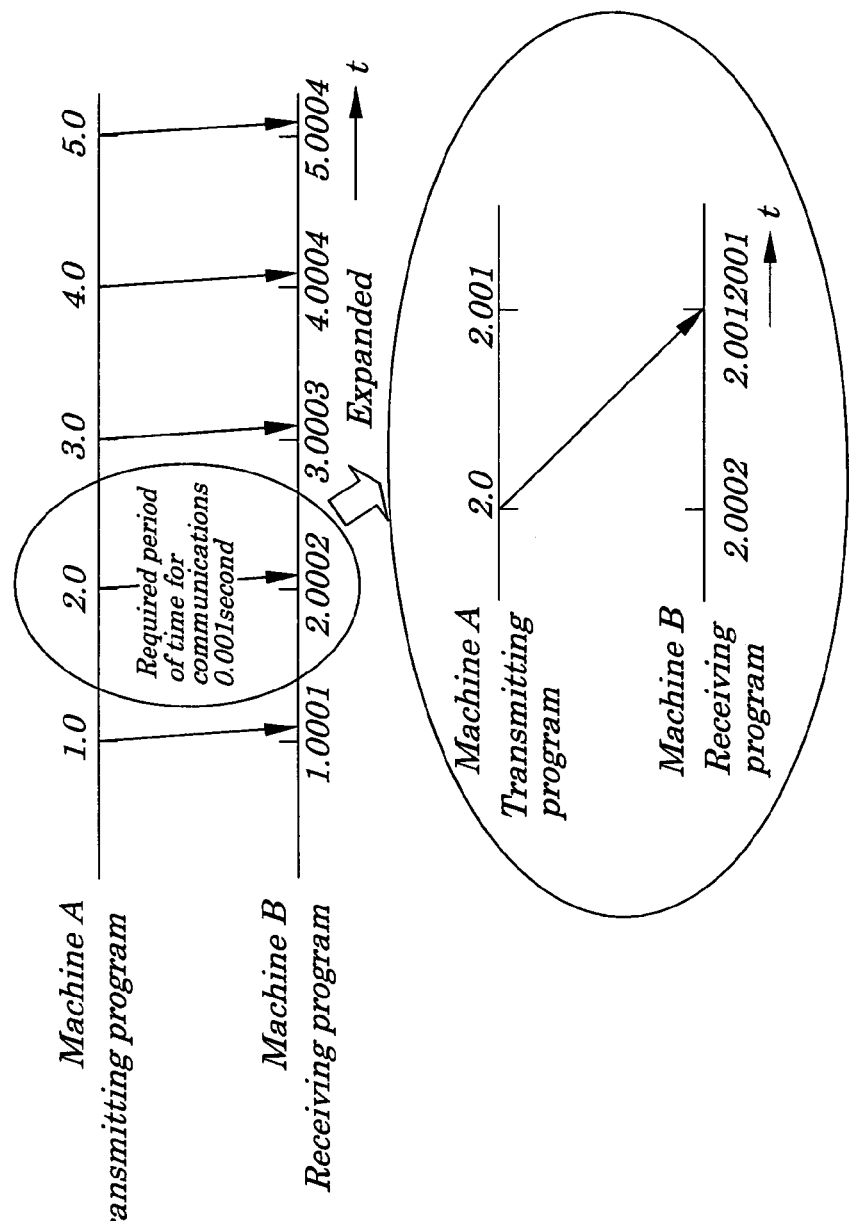
FIG. 5 is a time chart showing transmitting operations and receiving operations of the clock skew correcting system of the first embodiment of the present invention.
Figure 17:
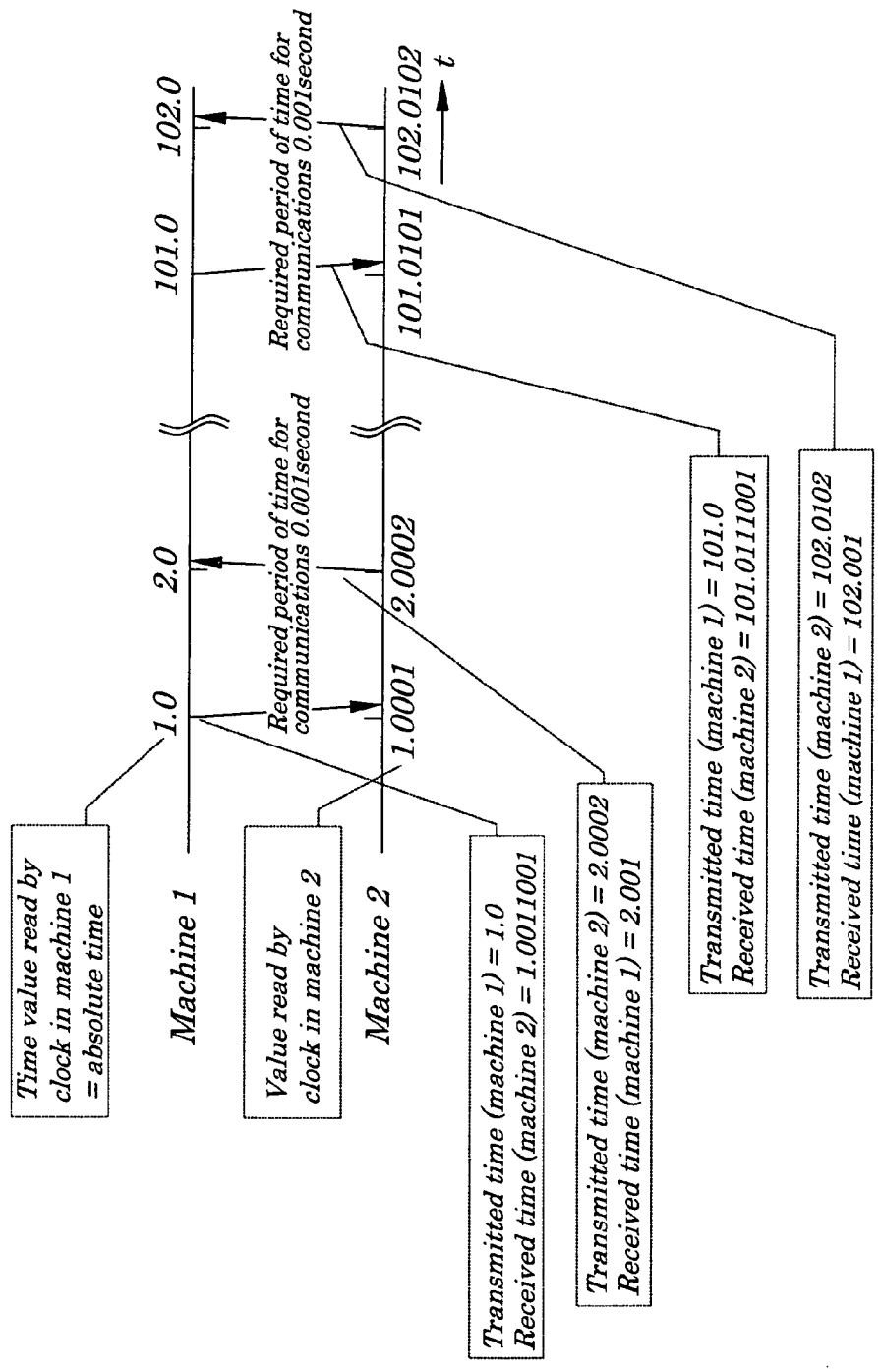
FIG. 17 is a diagram showing a time relation in each machine in the conventional technology.

It is here assumed that the transmitting program 111 with the number of times of communications set to be five, communication time interval set to be 1 second, and a party to communicate to be the machine B as its parameters is executed by the machine A, and the receiving program 121 with a party to communicate set to be the machine A as its parameter is executed by the machine B and an event trace data produced at the time of the executions of the programs is collected. FIG. 5 is a time chart showing transmitting operations and receiving operations of the clock skew correcting system of the first embodiment. A slanting arrow shows communications between machines A and B and a base portion of the arrow corresponds to a transmitting operation and a tip portion of the arrow corresponds to a receiving operation. It is also assumed that, as in the case of the setting in the conventional technology (shown in FIG. 17), the clock 124 embedded in the machine B goes 0.0001 times faster than the clock 114 in the machine A and, to simply the explanation of the operations, operations of the clocks 124 and 114 coincide with each other at time "0". A value shown by the clock 114 in the machine A is also called an "absolute time".

A signal transmitted by the machine A at time "1" is received by the machine B at time "1.001". When the time at which the signal was received is calculated by the clock 124 in the machine B, it is "1.0011001" being "1.0001" times larger than "1.001". Similarly, signals transmitted by the machine A at absolute time "2", "3", "4", and "5" seconds are received by the machine B respectively at absolute time "2.001", "3.001", "4.001", "5.001" seconds (the clock 124 in the machine B reads "2.0012001", "3.0013001", "4.0014001", "5.0015001" seconds respectively). The trace data obtained in operations for communications collected by the machine A is shown in FIG. 6 and the trace data obtained in operations for communications collected by the machine B is shown in FIG. 7. In FIGS. 6 and 7, the transmitted time is expressed as "tsn" (n=1, 2, ..., N) and the received time as "trn" (n=1, 2, ..., N) and values obtained in this embodiment are shown in each of parentheses. A time stamp (time) of each trace data is obtained from the clock embedded in each of the machines A and B and, therefore, a time stamp (time column) of the trace data collected by the machine does not coincide with the absolute time.

Figures 9, 10:
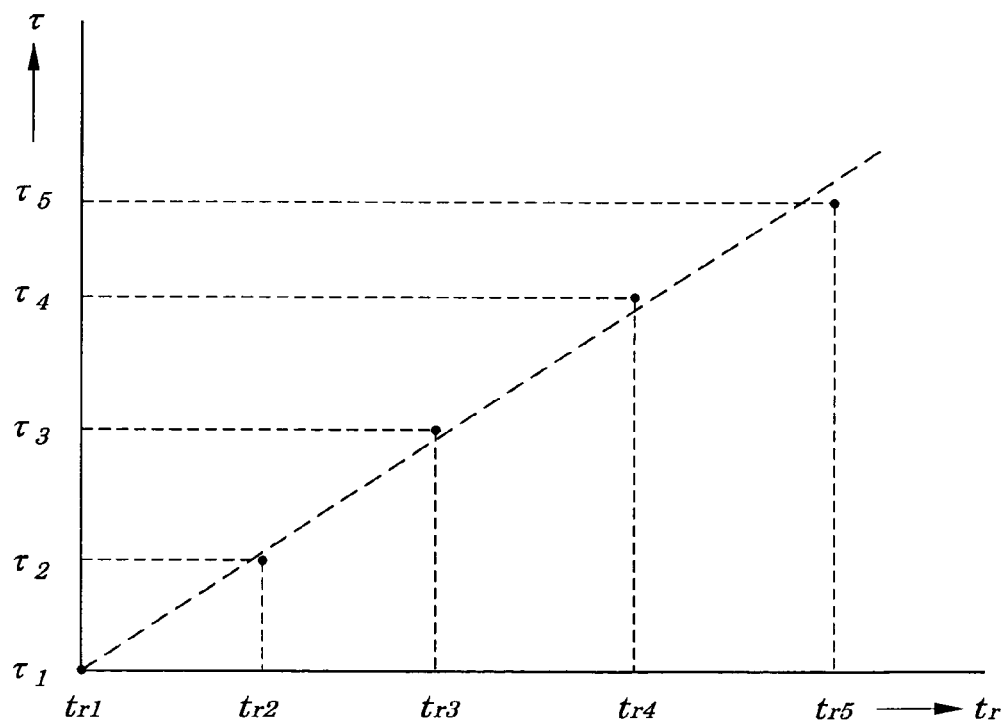
FIG. 9 is an equation representing an expression of a method of least square by which a difference in operations of clocks embedded in both machines (referring to FIGS. 7 and 8) is approximated according to the first embodiment of the present invention.
FIG. 10 is a graph showing a relation between approximation by a straight line and measured time according to the first embodiment of the present invention.

FIG. 8 shows a relation between received time (herein after denoted as "tn") and required period of time for communications (herein after denoted as "τn") calculated based on the trace data shown in FIGS. 6 and 7. When the relation between the "tn" and "τn" is approximated by a straight line, its slope (a) represents a difference in operations (represented as a clock skew value) of the clocks embedded in both the machines A and B and can be obtained by an equation of least square shown in FIG. 9. By substituting the value in the parenthesis shown in FIG. 8 and the number of items (N) being 5 into the above expression, a value "a" being "−0.00009999" is obtained. Moreover, in the embodiment, for descriptive simplification, values not containing a measurement error are used for the calculation, however, in the actual measurement, measured points do not lie on the straight line due to errors and, as shown in FIG. 10, and the measured point deviates from the approximate straight line. The reason why the method of least square for the calculation is employed in the embodiment is that the optimum approximate straight line is obtained even in such states as described above.

Figure 11:
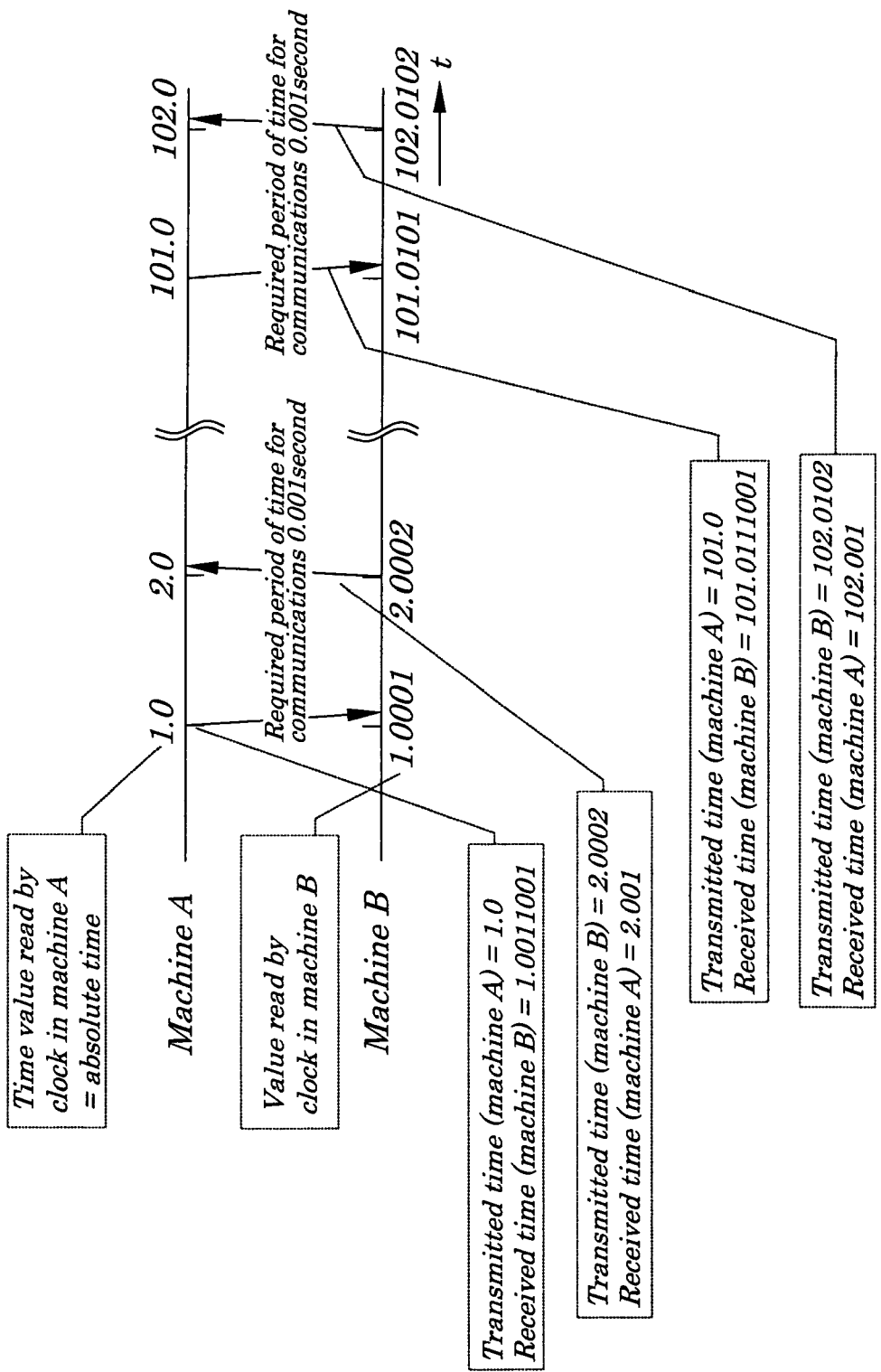
FIG. 11 is a diagram showing a time relation in each machine according to the first embodiment of the present invention.
Figure 12:
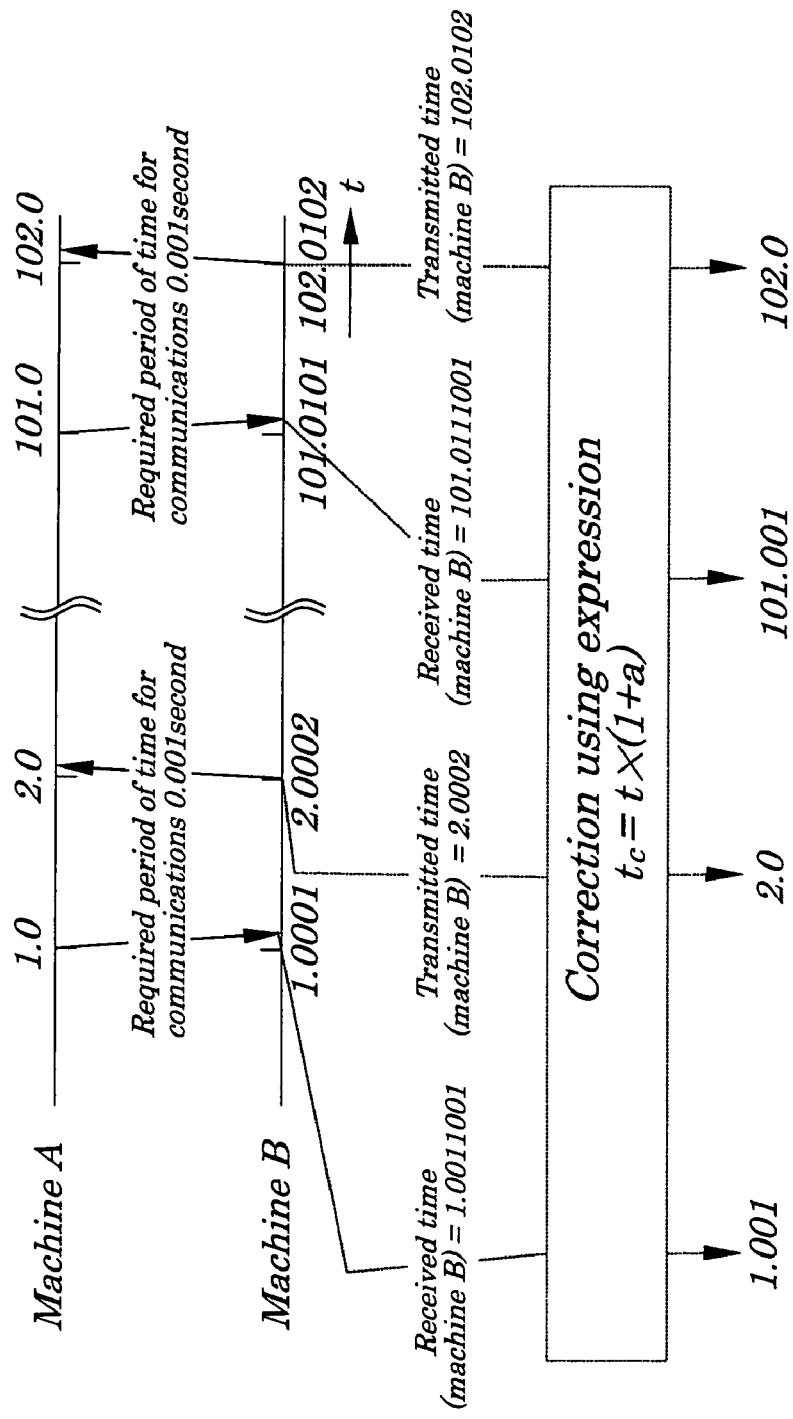
FIG. 12 is a diagram showing correction of a time stamp according to the first embodiment of the present invention.

Next, procedures for applying the clock skew value calculated by the above steps are described below. The time correcting section 101 applies a clock skew value to event trace data collected by executing the measuring object program 112 and the measuring object program 122 on the machines A and B. The time correcting section 101 receives, as an input, the clock skew value obtained by the clock skew analyzing section 100 and trace data collected by the machine A and the machine B. In the embodiment, the time stamp (t) contained in the trace data collected by the machine A continues to be used as it is and the value "tc" (=t×(1+a)) is substituted for time stamp value (t) in all the event data contained in the trace data collected by the machine B. The value "tc" denotes a time stamp value obtained after correction and the value "a" denotes a clock skew value. When a clock skew value (−0.00009999) is applied to the event trace data shown in FIG. 11, the time stamp indicating transmitted time or received time of the machine 2 is corrected as shown in FIG. 12. The required periods of time for communications (received time and transmitted time) shown in FIG. 13 are results from calculation by using the corrected time stamp value. The required periods of time for communications are calculated to be 0.001 seconds irrespective of a lapse of time, it is understood that a correction has been made so that the operation of the time stamp of the machine B is the same as that of the time stamp (absolute time) of the machine A.

Then, effects of the first embodiment of the present invention are described below.

In the first embodiment, the correction is made by the time correcting section to the time stamps contained in an event trace data collected by executing a given measuring program on the machines to be measured by utilizing a clock skew value obtained by an analysis on event trace data collected by executing the transmitting and receiving programs on a plurality of machines A and B to be measured, the various performance analyzing section is allowed to conduct an analysis of a plurality of data blocks collected by the plurality of machines to be measured on the assumption that operations of the time stamps coincide with each other. This enables the simplification of the structure of programs used to analyze various performance to be realized.

Second Embodiment

Next, configurations of the second embodiment are described. To explain this embodiment, FIGS. 1 and 2 showing the configurations and FIGS. 3 and 4 showing flow charts are used.

As in the case of the first embodiment, FIG. 14 shows results from calculation of received time and required periods of time for communications based on event trace data collected by executing a transmitting program 111 with the number of times of communications set to be five, communication time interval set to be 1 second, and a party to communicate with set to be the machine A as its parameters, on the machine A and by executing the receiving program 121 with a party to communicate with set to be the machine A on the machine B. This is an example in which, since the fourth communication procedure took much time after data arrived at the machine B and before the receiving operation was performed, time required for communications is apparently made longer. This is a phenomenon occurring when processing having a priority being higher than the receiving operation is being performed by the machines at the moment when the data has arrived at the machine. When an approximate straight line is obtained by the method of least square passing through five points using all the data shown in FIG. 14 as in the case of the first embodiment, its slope (skew value calculated by the expression shown in FIG. 9) is about 0.000964 and an intercept of a "τ" axis is about 0.000124. That is, the five points shown in FIG. 14 are approximated by the equation τ=0.00964·tr+0.000124.

Figure 15:
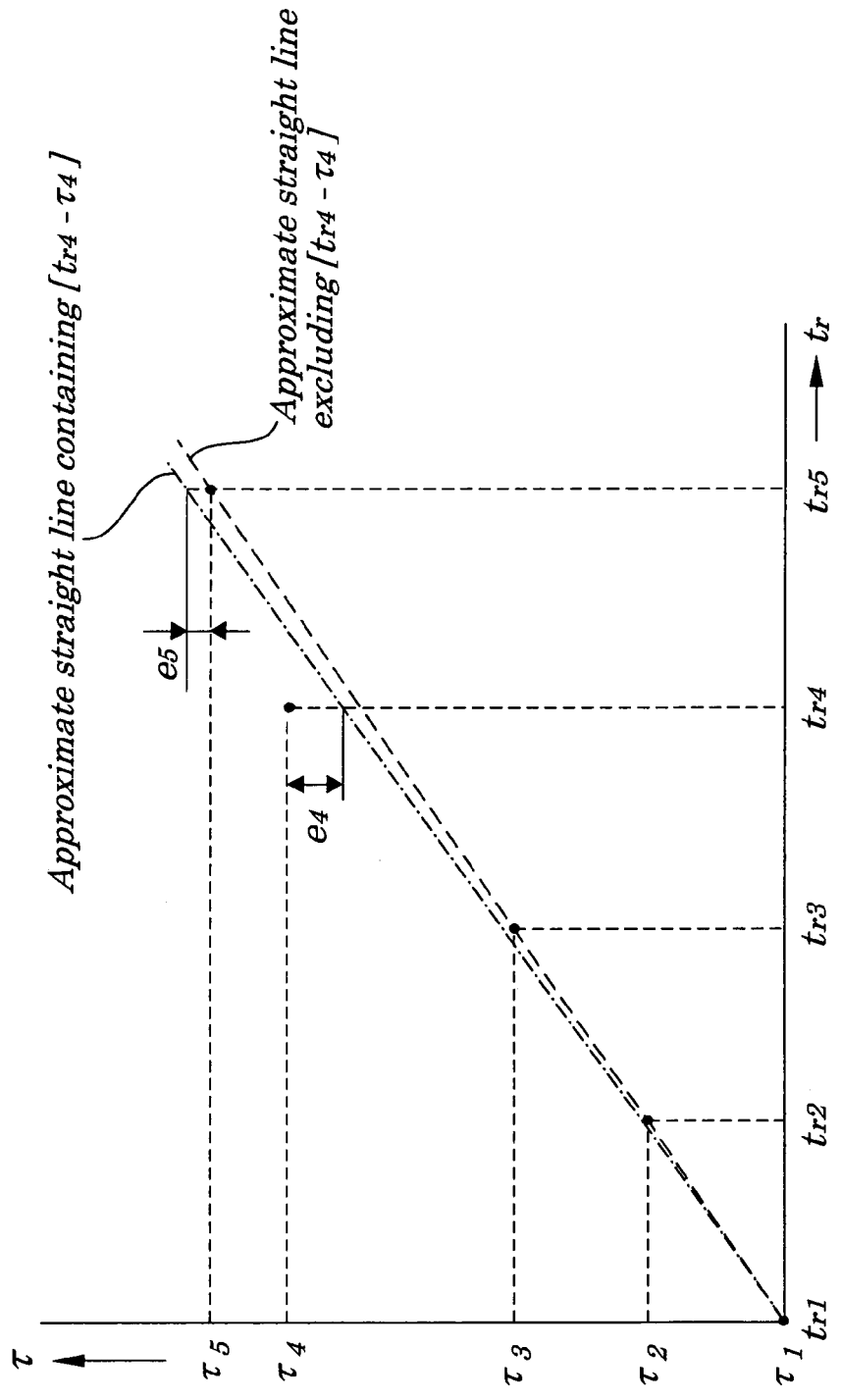
FIG. 15 is a graph showing a differential between a point on the appropriate straight line and a measured point according to the second embodiment of the present invention.
Figure 16:
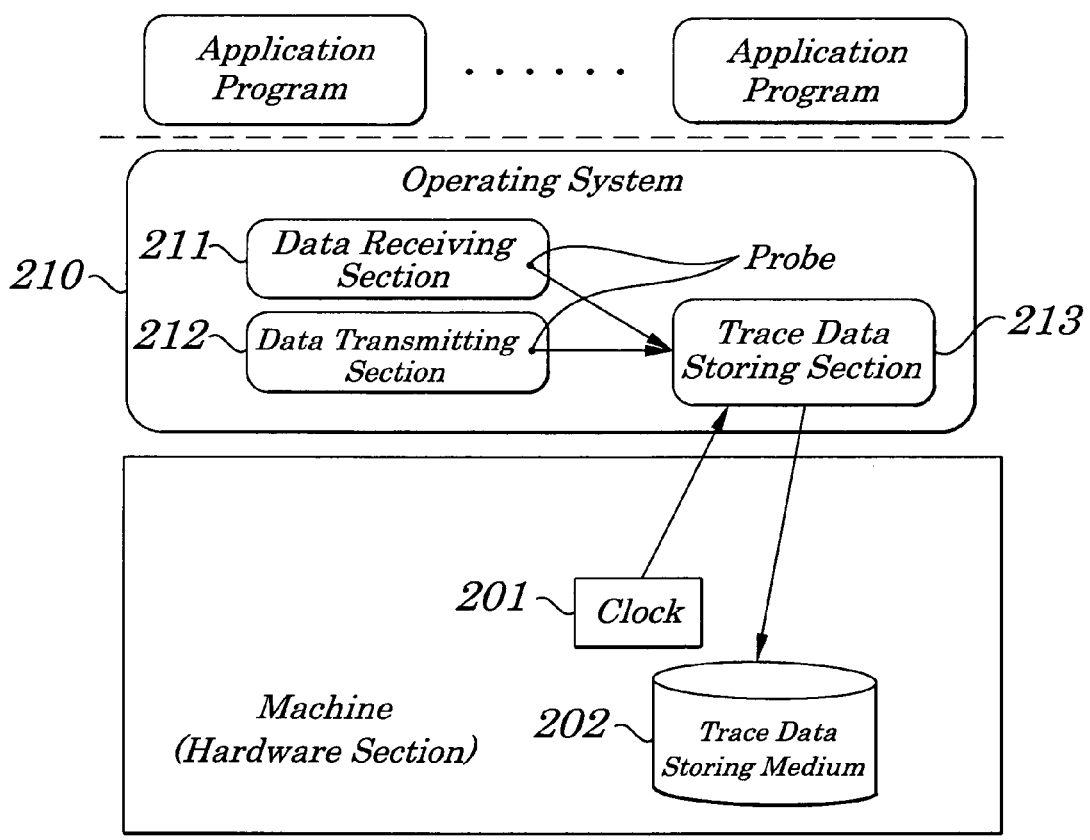
FIG. 16 is a diagram showing configurations of a conventional event trace collecting system.

In the second embodiment, for each point shown in FIG. 14, by substituting "tr1" to "tr5" into the equation, a predicted value of "τ", that is, a differential between a point on the approximate straight line and a measured point in an axis direction is calculated. This state is shown in FIG. 15 (only "e4" and "e5" are described due to the restriction of space). The "e1" to "e5" calculated for data shown in FIG. 14 is 0.0000103343, −0.000853994, −0.001718322, 0.006008958, and −0.003446977 respectively. Next, a threshold value of a predetermined error (0.001 in the first embodiment) is compared with each point of "e1" to "e5". If a point exceeding the threshold value as a result, an obtained clock skew value is made invalid and an approximate value is calculated at points except a point exceeding greatest (points of "tr4-τ4" in the second embodiment). In the case of data shown in FIG. 14, the approximate straight line obtained at the point except the points "tr4-τ4" passes through all measured points and, therefore, "e1" to "e3" and "e51" being a difference (error) between the predicted value and the measured value becomes zero. At all points used to obtain the appropriate straight line, the difference is smaller than a threshold value of the predetermined difference (0.001 in the second embodiment) and, therefore, the clock skew value obtained here is used as a result of the analysis conducted by the clock skew analyzing section 100.

The procedure of applying the clock skew value is the same as in the first embodiment.

The present invention can be applied to a performance analyzing means (program) to conduct performance an analysis by using, as an input, trace data collected, in almost the same time band, by a plurality of machines to be measured and by utilizing event information, stored in the data, about communication operations performed between machines.

It is apparent that the present invention is not limited to the above embodiments but maybe changed and modified without departing from the scope and spirit of the invention.

What is claimed is:

1. A time correcting method for event trace data to make a correction to time of occurrence of an event contained in the event trace data in which the event occurring at time of executing programs on a plurality of computers is stored as time-series data, said method comprising:
a first step of calculating a clock skew value being a difference in operations of clocks built-in in said plurality of computers to be measured; and
a second step of correcting the time of occurrence of the event contained in said event trace data collected by executing a given program on said plurality of computers to be measured by applying said clock skew value obtained in said first step, wherein said first step comprises:
a step of collecting event trace data by executing a transmitting program on one computer selected from said plurality of computers and a receiving program on another computer selected from said plurality of computers; and
a step of calculating the clock skew value being the difference in operations of the clocks built-in in said computers by an analysis of the collected event trace data, in which a plurality of transmitted events contained in the event trace data collected from said one computer on which said transmitting program was run are made to exactly correspond to a plurality of received events contained in said event trace data collected from said other computer on which said receiving program was run and then a required period of time for communications is calculated from a difference in time of occurrence of said transmitted event corresponding to the time of occurrence of received event and finally a clock skew value is obtained by approximating a change in the required period of time for the communications corresponding to the time of occurrence of received event using a linear equation.

2. The time correcting method for the event trace data according to claim 1, wherein effectiveness of said clock skew value is judged by approximating a change in the required period of time for the communications corresponding to the time calculated by the analysis of said event trace data using the linear equation and by calculating the difference between the required period of time for the communications obtained using the linear equation and said required period of time for communications obtained by the analysis on said event trace data.

3. The time correcting method for the event trace data according to claim 2, wherein, when said clock skew value is judged as not being effective, a case is handled as an object being outside of objects to be analyzed for communication operations in which a difference is big between the required period of time for the communications obtained by said linear equation by which a change in said required period of time corresponding with respect to time is approximated and the required period of time obtained by the analysis on the event trace data, and a clock skew value is again analyzed.

4. A time correcting system for the-event trace data to make a correction to time of occurrence of an event contained in the event trace data in which the event occurring at time of executing programs on a plurality of computers is stored as time-series data, said system comprising:

a first means of calculating a clock Skew value being a difference in operations of clocks built-in in said computers to be measured; and a second means of correcting the time of occurrence of the event contained in said event trace data collected by executing a given program on said plurality of computers to be measured by applying said clock skew value obtained by said first means, wherein said first means comprises:

a means of collecting event trace data by executing a transmitting program on one computer selected from said plurality of computers and a receiving program on another computer selected from said plurality of computers; and a means of calculating the clock skew value being the difference in operations of the clocks built-in in said computers by an analysis of the collected event trace data, in which a plurality of transmitted events contained in the event trace data collected from said one computer on which said transmitting program was run are made to exactly correspond to a plurality of received events contained in said event trace data collected from said other computer on which said receiving program was run and then a required period of time for communications is calculated from a difference in time of occurrence of said transmitted event corresponding to the time of occurrence of received event and finally a clock skew value is obtained by approximating a change in the required period of time for the communications corresponding to the time of occurrence of received event using a linear equation.

5. The time correcting system for the event trace data according to claim 4, wherein effectiveness of said clock skew value is judged by approximating a change in the required period of time for the communications corresponding to the time calculated by the analysis of said event trace data using the linear equation and by calculating the difference between the required period of time for the communications obtained using the linear equation and said required period of time for communications obtained by the analysis on said event trace data.

6. The time correcting system for the event trace data according to claim 5, wherein, when said clock skew value is judged as not being effective, a case is handled as an object being outside of objects to be analyzed for communication operations in which a difference is big between the required period of time for the communications obtained by said linear equation by which a change in said required period of time corresponding with respect to time is approximated and the required period of time obtained by the analysis on the event trace data, and a clock skew value is again analyzed.

7. A time correcting program for event trace data stored in a computer-readable storage medium to have a computer execute a time correcting method for event trace data to make a correction to time of occurrence of an event contained in the event trace data in which the event occurring at time of executing programs on a plurality of computers is stored as time-series data, said method comprising:

a first step of calculating a clock skew value being a difference in operations of clocks built-in in said plurality of computers to be measured; and a second step of correcting the time of occurrence of the event contained in said event trace data collected by executing a given program on said plurality of computers to be measured by applying said clock skew value obtained in said first step, wherein said first step comprises:

a step of collecting event trace data by executing a transmitting program on one computer selected from said plurality of computers and a receiving program on another computer selected from said plurality of computers; and a step of calculating the clock skew value being the difference in operations of the clocks built-in in said computers by an analysis of the collected event trace data, in which a plurality of transmitted events contained in the event trace data collected from said one computer on which said transmitting program was run are made to exactly correspond to a plurality of received events contained in said event trace data collected from said other computer on which said receiving program was run and then a required period of time for communications is calculated from a difference in time of occurrence of said transmitted event corresponding to the time of occurrence of received event and finally a clock skew value is obtained by approximating a change in the required period of time for the communications corresponding to the time of occurrence of received event using a linear equation.

8. The time correcting program for the event trace data according to claim 7, wherein effectiveness of said clock skew value is judged by approximating a change in the required period of time for the communications corresponding to the time calculated by the analysis of said event trace data using the linear equation and by calculating the difference between the required period of time for the communications obtained using the linear equation and said required period of time for communications obtained by the analysis on said event trace data.

9. The time correcting program for the event trace data according to claim 8, wherein, when said clock skew value is judged as not being effective, a case is handled as an object being outside of objects to be analyzed for communication operations in which a difference is big between the required period of time for the communications obtained by said liner equation by which a change in said required period of time corresponding with respect to time is approximated and the required period of time obtained by the analysis on the event trace data, and a clock skew value is again analyzed.

* * * * *